Sept. 20, 1960 N. EMMONS III 2,953,014
PNEUMATIC GAGING CIRCUIT
Filed May 24, 1957 2 Sheets-Sheet 1

INVENTOR.
Nelson Emmons III
BY
Ernest J. Hix
atty.

United States Patent Office 2,953,014
Patented Sept. 20, 1960

2,953,014

PNEUMATIC GAGING CIRCUIT

Nelson Emmons III, Dayton, Ohio, assignor to The Sheffield Corporation, Dayton, Ohio, a corporation of Delaware Filed May 24, 1957, Ser. No. 661,497

3 Claims. (Cl. 73—37.8)

This invention relates to gaging circuits and more particularly to pneumatic gaging circuits for measuring product characteristics.

It is an object of this invention to provide an improved gaging circuit of the pneumatic type responsive to a differential in flows determined by dimensions or other product characteristics.

It is a further object of this invention to provide such a circuit which is rapidly and accurately responsive and which has features of simplicity in construction and operation.

It is a further object to provide a gage having means for accurately measuring the flow through a measuring passage communicating between a pair of gaging paths wherein major gage head controlled flows take place which relatively vary with a gaged characteristic of a part, the minor flow through the measuring passage varying with the relationship between the gaging flows and the gaged characteristic.

It is a further object to provide such a circuit having a pair of gaging passages in which flows are obtained which relatively vary in accordance with gaged product characteristics including such characteristics as taper, eccentricity, hole center distance or other differentials between different part portions, flow responsive measuring means being included in a measuring passage connected between the gaging passages, the flow through the measuring passage being determined by the relationship between the flows in the gaging passages, whereby a dynamic differential gaging circuit is provided to rapidly obtain a single response to the relationship between variable conditions.

Figures 1, 2:
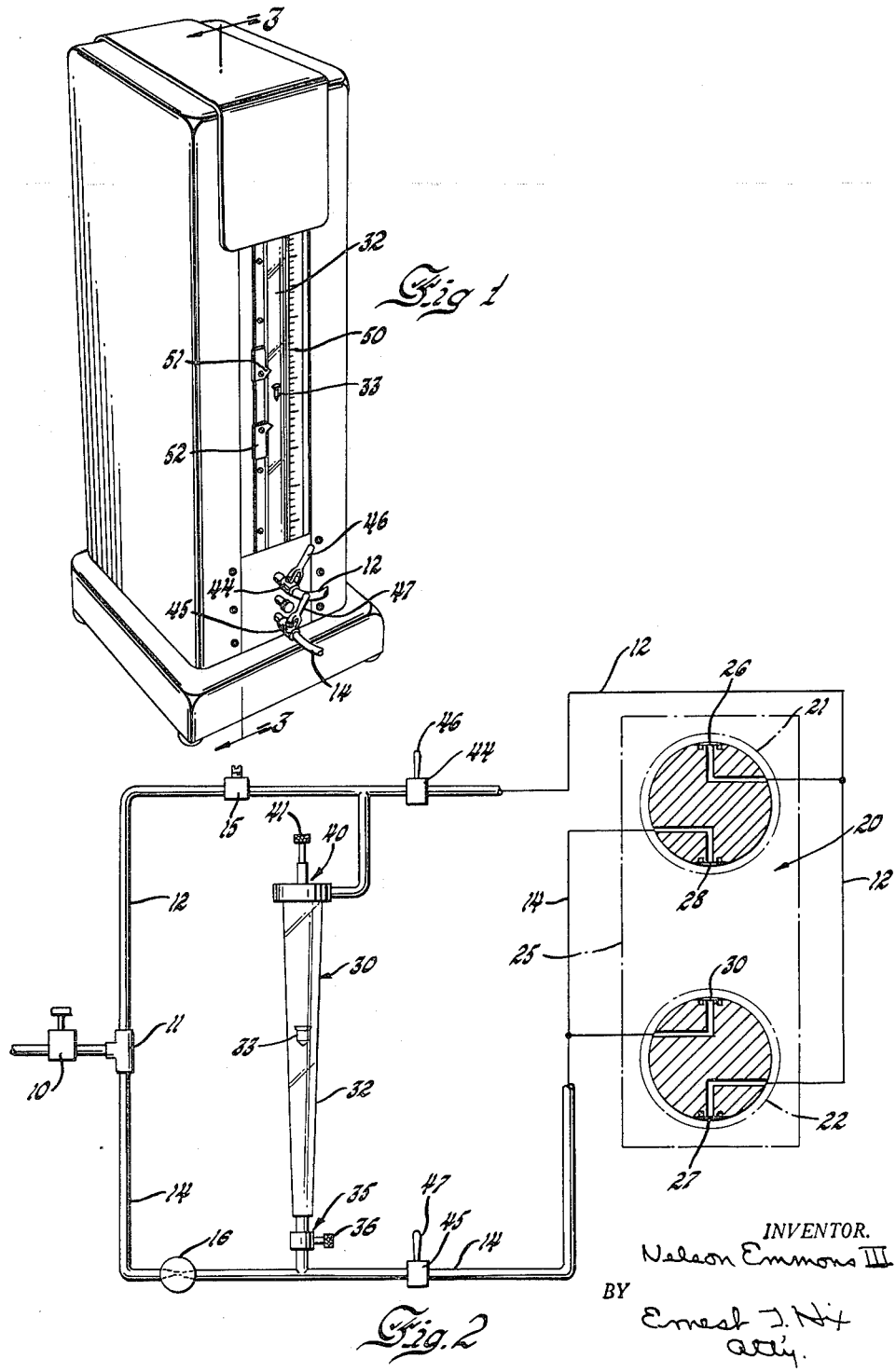
Figure 3:
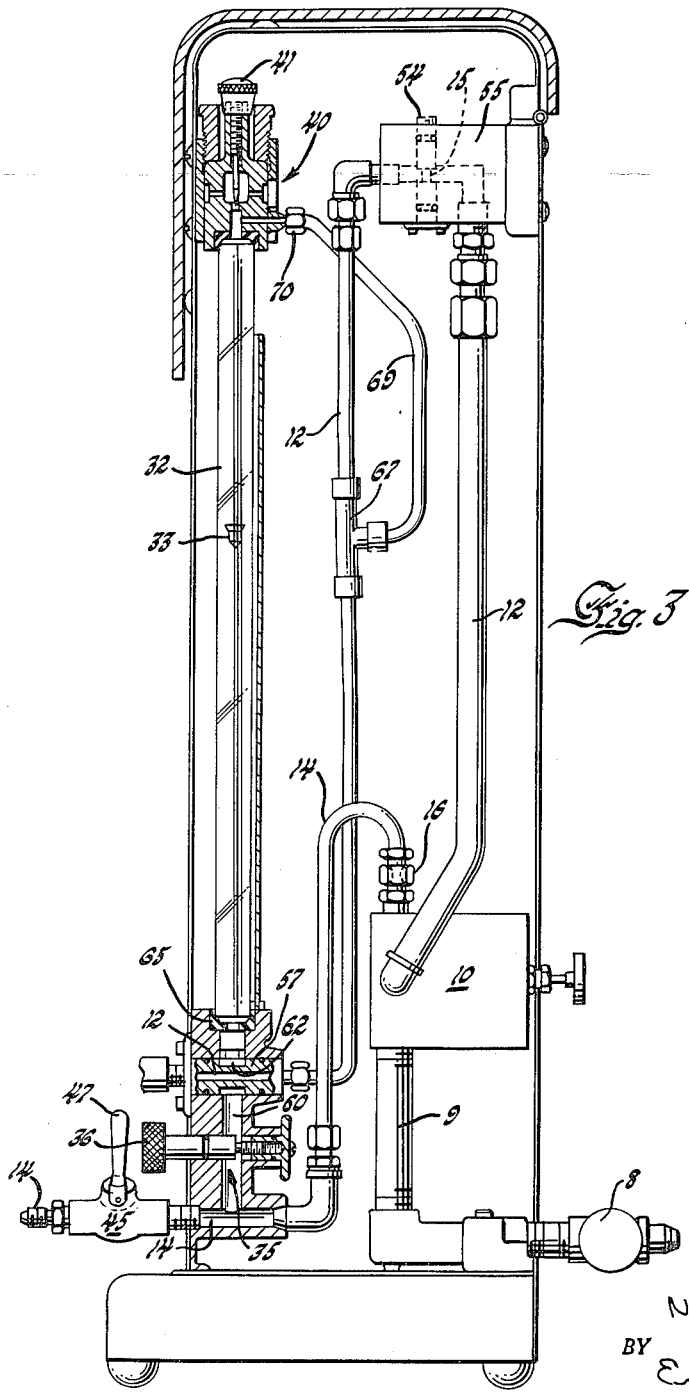

Other objects and advantages of the invention will be apparent from the following description, the appended claims, and the accompanying drawings, in which:

Fig. 1 illustrates in perspective an exemplary instrument embodying the present invention, Fig. 2 is a diagram of the circuit of the instrument of Fig. 1, illustrating an exemplary gaging application, and Fig. 3 is a longitudinal central section of the instrument taken on line 3—3 of Fig. 1.

The present invention provides a precision gaging circuit of the pneumatic type wherein a single response is dynamically obtained which varies in accordance with the relative flows between gaging passages adapted for connection to gage heads or the like. While the invention has been illustrated in a particular embodiment and a particular application for the purpose of disclosing the present invention, it should be understood that the invention is capable of embodiment in other and materially different constructions and in a wide variety of applications.

In the particular illustrated embodiment air from a regulated source passes through restrictions provided in a pair of branch passages connected to a gaging head. The exemplary gaging head is of a construction which provides differential pressures between the gaging passages which vary in accordance with the center distance between holes in a part. A measuring passage is connected between the gaging passages downstream of the respective restrictions and the flow through the measuring passage is determined by the pressure differences thereacross and the gaged center distance. Flow is continuous through the measuring passage and flow-responsive gaging means are provided in the passage for obtaining a single response determined by the gaged characteristic. Because of the dynamic character of the circuit its response is extremely rapid and accurate.

One gaging means which has particularly advantageous application in the present circuit involves the inclusion of a vertically disposed transparent flow tube as a portion of the gaging passage. An indicating float movable along an internal taper of the flow tube is positioned in accordance with the flow through the tube and between the gaging passages to provide a single indication. Thus an indicating structure is provided responsive to the relationship between two flows which is the ultimate in simplicity, avoiding the use of mechanical actuations, electrical connections and the like. Further, there are no elements subject to damage upon extreme pressure differentials such as diaphragms subject to rupture and the like.

Referring more particularly to the drawings, Fig. 2 illustrates diagrammatically an exemplary circuit. Air from a suitable source is supplied to a pressure regulator 10 and from the regulator through a common supply connection 11 to branch gaging passages 12 and 14. Gaging passage 12 includes an adjustable equalization restriction 15. Passage 14 has a fixed restriction at 16. Each of gaging passages 12 and 14 leads to a pair of orifices included in the spindles of a center distance gaging unit 20. While the invention is capable of many different applications, it has been illustrated as applied to measuring the center distance between holes 21 and 22 in a part 25, shown in phantom in Fig. 2.

Gaging passage 12 leads to opposed orifices 26 and 27 which are in flow-controlling relationship with the most distant surfaces of holes 21 and 22. Orifices 28 and 30 controlled by the innermost surfaces of these holes are connected to gaging passage 14. A change in diameter of either of the holes will equally affect an orifice in the outlet of each gaging passage and the relative flow through the gaging passages will not be changed thereby. However, if the center distance between holes 21 and 22 varies in this illustrative application, the relationship between the flows through gaging passages 12 and 14 will be changed. Note for example if the hole 21 were shifted upward (center distance increase) it would reduce the flow through orifice 28, reducing the total flow through passage 14. Simultaneously, it would open orifice 26 and increase the flow through passage 12. Thus, a differential flow condition results wherein the relationship between the flows varies in accordance with the center distance.

Such variance in flows through gaging passages 12 and 14 will cause a pressure drop along the respective gaging passages which varies in accordance with that flow. Thus the pressure between restriction 15 of passage 12 and its gage head connection and the pressure between restriction 16 of passage 14 and its gage head connection are both determined in accordance with the gaged characteristic.

A measuring passage 30 including flow responsive gaging means is placed in communication with gaging passages 12 and 14 at points downstream of the respective restrictions 15 and 16. In this embodiment this measuring means includes a vertically disposed internally tapered transparent flow tube 32 having an indicating float 33 movable therealong. The flow through measuring passage 30 will be determined by the differential in pressure across its connections with the respective gaging passages 12 and 14 and float 33 will respond to provide a single indication of this relationship and the gaged characteristic. The relationship between the restrictions of the circuit is such that pressures at the lower end of tube 32 exceed those at the upper end and the flow is always upward, although it varies with the differential in these pressures.

An adjustable restriction 35 controlled by knob 36 is in series with tube 32 at its lower end and provides an amplification adjustment for use in a set-up procedure later described. A relief adjustment to atmosphere at 40 controlled by knob 41 is used in set-up, and shut-off valves 44 and 45 controlled respectively by levers 46 and 47 are used in a checking procedure for the system.

Components of the system of Fig. 2 have been similarly numbered in the instrument of Figs. 1 and 3. Thus, air supplied through a manually controlled cut-off valve 8 passes through a pipe 9 to regulator 10. From regulator 10 it is supplied to branch gaging passages 12 and 14. Indicating tube 32 is supported between upper and lower components of the instrument and includes float 33. A scale 50 and adjustable maximum and minimum positions 51 and 52 are provided at the face of the instrument. Passage 12 leads past adjustable restriction 15 controlled by a screw adjustment 54 threaded within unit 55 at the upper end of the instrument cabinet. From restriction 15 passage 12 leads through insert 57 and out the forward face of the instrument through shut-off valve 44 and to the gage head.

Similarly, gaging passage 14 leads from regulator 10 and through the lower component of the instrument, shut-off valve 45, and to the gage head. Restriction 16 is provided in passage 14 by means of an insert just above regulator 10.

Measuring passage 30, which communicates between gaging passages 12 and 14 and includes flow tube 32, has a portion provided by a passage 60, a reduced portion 62 of insert 57 and seat 65 for the lower end of the tube. A T-connection 67 is provided in gaging passage 12 and a conduit 69 leading therefrom connects at 70 at the upper end of flow tube 32 and relief adjustment 40. Amplification control 35 is threaded into the lower component and has a surface variably controlling the flow through passage 60. Thus, the relative flows through passages 12 and 14 effectively determine the differential in pressure across ends of measuring passage 30 and tube 32. The flow upward through tube 32 is responsive to this differential in pressure and float 33 is positioned in accordance therewith.

In a set-up procedure provided for this circuit the initial step is connecting a pressure gage to the outlet of one of the gaging passages, closing off the other passage by one of valves 44 or 45, and setting regulator 10 at the desired level. In the particular illustrated example masters with maximum allowable and minimum allowable center distance characteristics can be provided. The masters are alternatively applied and relief adjustment 41 and amplification adjustment 36 conjointly adjusted so that the float arrives opposite pointers 51 and 52 respectively with the maximum and minimum masters in position.

A further check is necessary to insure that the flows through the upper and lower gaging circuits are properly correlated. In using a pair of masters one of the masters is first applied. For example, the minimum center distance master is first placed on the spindles of unit 20. Valve 45 is closed and the rise of float 33 above the minimum pointer 52 is noted. The maximum spaced master is then placed in position, upper valve 44 is closed (valve 45 open), and the distance of the float below maximum pointer 51 is checked. If the respective float displacements above and below the minimum and maximum pointers are equal the gaging circuits are properly balanced.

If the displacements are not equal, adjustment of equalization restriction 15 is necessary. For example, if the float drop from maximum pointer 51 is greater than the rise from minimum pointer 52 with the masters alternatively applied and valves 44 and 45 alternatively closed, then equalization restriction 15 should be opened slightly. Further checking and adjustment may be necessary to obtain proper response of indicating float 33 along tube 32 and correlation between the gaging passages.

Thus it is seen that a differential gaging circuit operating on a dynamic flow principle has been provided with an extremely simple circuit and for a variety of applications. The circuit is extremely rapid in response and contains no troublesome mechanical or electrical components. It is easily set up by an untrained operator and provides an extremely rapid single indication of a relationship between gaged conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A pneumatic differential gaging circuit comprising a common supply for connection to a source of air under pressure, an adjustable pressure regulator in said supply, a pair of branch gaging passages leading from said supply means and receiving air at the same regulated pressure, the relative flows through the gaging passage being determined by a gaged product, each gaging passage have a restriction therein causing a pressure drop thereacross which varies with flow through the respective gaging passage, a differential measuring passage in communication between said gaging passages downstream of the respective restrictions for flow through the measuring passage and between the gaging passages in accordance with the pressure difference across the ends of the measuring passage, gaging means in said measuring passage responsive to the flow therethrough and the relative flows through the gaging passages, an adjustable restriction in said measuring passage upstream of said gaging means, and an adjustable relief direct to atmosphere from the measuring passage at the downstream side of said gaging means, whereby a predetermined response of said gaging means can be obtained for any particular product gaged.

2. A pneumatic differential gaging cicuit comprising supply means for connection to a source of air under pressure, said supply means including a regulatar for precisely maintaining predetermined supply pressure, means providing a pair of gaging passages connected to said supply means, means for connecting each of said passages to a gaging head, whereby flow therethrough is determined by the product gaged, each gaging passage having such restriction to flow as to cause a pressure drop therealong which varies in accordance with the flow therethrough, a differential measuring passage in communication between said gaging passages for flow through the measuring passage and between the gaging passages in accordance with the pressure difference across the measuring passage, at least a portion of said measuring passage being provided by a vertically disposed internally tapered transparent flow tube, an indicating float positioned along said tube in accordance with the flow therethrough, whereby said indicating float is responsive to the flow through said measuring passage as determined by the relative flows through the gaging passages, an adjustable restrictor in the measuring passage at the lower end of the flow tube, and an adjustable relief direct to atmosphere from the measuring passage at the upper end of the flow tube, whereby flow response for any particular product gaged can be obtained at predetermined response levels along the tube.

3. A pneumatic differential gaging circuit comprising a common supply for connection to a source of air under controlled pressure, a pair of branch gaging passages leading from said supply connection, means adapting each of said passages for connection to a gaging head, whereby the flow through each of the gaging passages is determined by a gaged product, a restriction in each of said passages causing a pressure drop therealong which varies in accordance with the flow therethrough at least one of said restrictions being adjustable to obtain a desired balanced flow condition in the passages for accurate gaging results, a differential measuring passage in communication between said gaging passages downstream of the respective restrictions for flow through the measuring passage and between the gaging passages in accordance with the pressure difference across the measuring passage, said measuring passage including a vertically disposed internally tapered transparent flow tube and an indicating float movable therealong, whereby the position of said indicating float is determined by the relative flows through the gaging passages, an adjustable restriction in the measuring passage at the lower end of the flow tube, and an adjustable relief direct to atmosphere from the measuring passage at the upper end of the flow tube, whereby flow response for any particular product gaged can be obtained at predetermined response levels along the tube, and an adjustable cut-off valve in each of said gaging passages downstream of the connection of the respective gaging passage with the measuring passage.

References Cited in the file of this patent

UNITED STATES PATENTS

| | | |
|---|---|---|
| 2,573,843 | Hendrix et al. | Nov. 6, 1951 |
| 2,593,957 | Aller | Apr. 22, 1952 |
| 2,594,077 | Schulze | Apr. 22, 1952 |
| 2,779,188 | Meyer | Jan. 29, 1957 |
| 2,790,320 | Salko et al. | Apr. 30, 1957 |